United States Patent
Reipold et al.

(10) Patent No.: US 8,397,043 B2
(45) Date of Patent: Mar. 12, 2013

(54) MEMORY MAPPING SYSTEM, REQUEST CONTROLLER, MULTI-PROCESSING ARRANGEMENT, CENTRAL INTERRUPT REQUEST CONTROLLER, APPARATUS, METHOD FOR CONTROLLING MEMORY ACCESS AND COMPUTER PROGRAM PRODUCT

(75) Inventors: Anthony Reipold, Austin, TX (US); Houman Amjadi, Karlsruhe (DE); Lukusa D. Kabulepa, Erzhausen (DE); Andreas Kirschbaum, Darmstadt (DE); Adrian Traskov, Steinbach (DE)

(73) Assignees: Freescale Semiconductor, Inc., Austin, TX (US); Continental Teves AG & Co. OHG, Frankfurt (DE)

( * ) Notice: Subject to any disclaimer, the term of this patent is extended or adjusted under 35 U.S.C. 154(b) by 336 days.

(21) Appl. No.: 12/808,382

(22) PCT Filed: Dec. 17, 2007

(86) PCT No.: PCT/IB2007/055170
§ 371 (c)(1),
(2), (4) Date: Jun. 16, 2010

(87) PCT Pub. No.: WO2009/077813
PCT Pub. Date: Jun. 25, 2009

(65) Prior Publication Data
US 2010/0268905 A1    Oct. 21, 2010

(51) Int. Cl.
*G06F 12/00* (2006.01)
(52) U.S. Cl. .......................... 711/163; 345/502
(58) Field of Classification Search .................. 711/163; 345/502
See application file for complete search history.

(56) References Cited

U.S. PATENT DOCUMENTS

| | | | |
|---|---|---|---|
| 5,109,329 | A | 4/1992 | Strelioff |
| 5,367,689 | A | 11/1994 | Mayer et al. |
| 5,437,047 | A | 7/1995 | Nakamura |
| 5,446,910 | A | 8/1995 | Kennedy et al. |
| 5,778,236 | A | 7/1998 | Gephardt et al. |
| 6,775,730 | B2 | 8/2004 | Marr et al. |
| 6,845,419 | B1 | 1/2005 | Moyer |
| 6,952,749 | B2 | 10/2005 | Kim |
| 7,073,173 | B1 | 7/2006 | Willman |
| 2002/0087500 | A1* | 7/2002 | Berkowitz et al. ............. 707/1 |
| 2005/0190192 | A1* | 9/2005 | Emmot et al. ............. 345/502 |
| 2006/0026443 | A1 | 2/2006 | McMahan et al. |
| 2008/0109593 | A1* | 5/2008 | Karamcheti et al. .......... 711/103 |
| 2008/0244206 | A1* | 10/2008 | Heo et al. .................. 711/163 |
| 2008/0282051 | A1* | 11/2008 | Grabner ...................... 711/169 |

FOREIGN PATENT DOCUMENTS

WO    97/44738 A    11/1997

OTHER PUBLICATIONS

International Search Report and Written Opinion correlating to PCT/IB2007/055170 dated Dec. 1, 2008.

* cited by examiner

*Primary Examiner* — Hashem Farrokh (57) ABSTRACT

A memory mapping system is connectable to a multi-processing arrangement. The multi-processing arrangement includes a first processing unit and a second processing unit. The memory mapping system includes a main memory to which the second processing unit does not have write access, the main memory including a first memory section and a second memory section. An associated memory is associated with the second memory section. The associated memory includes a memory section to which the second processing unit has write access. A consistency control unit can maintaining consistency between data stored in the associated memory and data stored in the second memory section.

19 Claims, 4 Drawing Sheets

MEMORY MAPPING SYSTEM, REQUEST CONTROLLER, MULTI-PROCESSING ARRANGEMENT, CENTRAL INTERRUPT REQUEST CONTROLLER, APPARATUS, METHOD FOR CONTROLLING MEMORY ACCESS AND COMPUTER PROGRAM PRODUCT

FIELD OF THE INVENTION

This invention relates to a memory mapping system, to a request controller, to a multi-processing arrangement, to a Central Interrupt Request Controller, to an apparatus, to a method for controlling memory access and to a computer program product.

BACKGROUND OF THE INVENTION

Multi-processing arrangements are known in the art. For example, microprocessors and microcontrollers are known which include two or more processing cores. Such microprocessors and microcontrollers are referred to in the art as multi-core processors. However, multi-processing arrangements require optimization of other components such as, in the case of multi-core processors the interrupt controller and the memory. Different methods have been disclosed in the art to optimize interrupt controllers for multi-core processors.

International Patent Application Publication WO 97/44738 discloses a multi-processing computer system which includes an interrupt controller coupled to an expansion bus. The programmable interrupt controller has multiple storage locations at the same address for multiple central processing units or CPUs. The CPUs are coupled to a host bus which in turn is coupled to the expansion bus by means of a bus bridge. An arbiter is coupled to the host bus for arbitrating bus mastership amongst the CPUs. CPU host owner identification is transferred across the bus bridge to the programmable interrupt controller. The programmable interrupt controller uses the CPU host owner identification to determine which storage location is to be accessed.

However, a disadvantage of the system disclosed in this prior art document is that it is very complicated and costly for a practical implementation of the Central Interrupt Request Controller, if a generic solution for a large family of multi-core processors is aimed at. Typically, protection mechanisms are employed for a register set whereas the protection mechanisms requested in WO 97/44738 have to be applicable to individual registers in order that the solution stays generic to the greatest extent possible. The implementation of this solution becomes even more difficult when bits of one single register are allocated to different processing cores, which may for example occur for bits used to control software interrupts and inter-processor interrupts.

SUMMARY OF THE INVENTION

The present invention provides a memory mapping system, a request controller, a multi-processing arrangement, an apparatus, a method for controlling memory access and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, features and advantages of the invention can be taken from the following description and drawings of examples of embodiments. In the accompanying drawings.

DETAILED DESCRIPTION OF THE PREFERRED EMBODIMENTS

Figure 1:
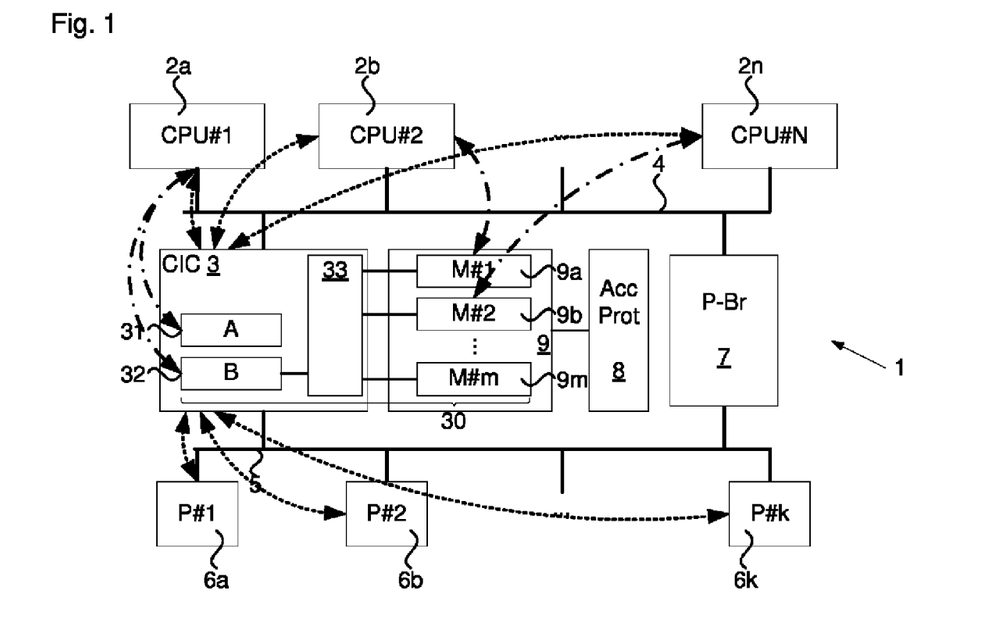
FIG. 1 shows a block diagram of an example of an embodiment of a multi-processing arrangement.

Referring to FIG. 1, the example of a multi-processing arrangement 1 shown therein includes a plurality of processing units 2a-2n. The multi-processing arrangement 1 may include any suitable number of processing units. The multi-processor system 1 may for example include two or more, such as three or more, such as four or more processing units. The multi-processing arrangement 1 may for example be implemented as single package composed of a single die, or of two or more dies packaged together.

As shown in FIG. 1, multi-processing arrangement 1 may include a request controller 3. The request controller 3 may include a memory mapping system 30. The shown memory mapping system 30 is connected to the processing units 2a-2n. However the memory mapping system 30 may be provided as a separate component which can be connected to the multi-processing arrangement 1.

The memory mapping system 30 may include a main memory. The main memory may include a first memory section 31 and a second memory section 32. Of the processing units 2a-2n, one or more processing units 2a-2n may be designated first processing unit, which have write access to the main memory. One or more processing units 2a-2n may be designated second processing unit(s), which do not have write access to the main memory.

The memory mapping system 30 may include one or more associated memories 9a-9m, which are associated with the second memory section 32. The associated memories 9a-9m may each include a memory section to which a respective one of the second processing units has write access. The memory mapping system 30 may include a consistency control unit 33. The consistency control unit 33 may maintain consistency between data stored in the associated memory 9a-9m and the second memory section 32.

Thus, the first memory section 31 is protected against inadvertent modification by a respective second processing unit. Accordingly, in the first memory section 31 data may be stored which has to be protected, such as configuration data of the multi-processing arrangement 1 or other critical data. The data in the first memory section 31 may for example be stored before operation, and for example be protected from writing by any of the processing units. Alternatively, the first processing unit may have write access to at least the first memory section of the main memory.

In addition, the information in the second memory section 32 and the associated memory 9a-9m remains consistent, thereby enabling usage by the first processing unit of data stored in the associated memory 9a-9m and enabling usage by the second processing unit of data stored in the second memory section. Thus, critical data may be protected in a simple manner whereas non-critical data can be shared and/or exchanged and/or used by both the first and second processing units in a relatively simple manner.

The memory mapping system 30 may be implemented in any manner suitable for the specific implementation. The number of the associated memories may for instance correspond to the number of the processing units. For instance, the memory mapping system 30 may include two or more associated memories, to each of which a respective second processing unit has write access and to which the other processing units in the multi-processing arrangement 1 do not have write access. For example, each associated memory 9a-9m may be associated with one second processing unit (e.g. in the example of FIG. 1 the amount n of processing units may be related to the amount m of associated memories as n=m+1) and/or each second processing unit may have write access to one associated memory 9a-9m.

The main memory 30 and the associated memories 9a-9m may for example both be part of a memory of the request controller 3 and/or of the multi-processing arrangement 1. For example, the request controller 3 may include a set of registers. which may be split up in a number of register sets, such as a set A which forms the first memory section 31, a set B which forms the section memory section 32 and a respective set M#1-M#m for each associated memory 9a-9m. The register set which forms the first memory section 31 may for example contain configuration registers of the controller 3 which are to stay unmodified during the handling of a request, e.g. during the execution of an interrupt by one or more of the processing units 2a-2n. The register set which forms the second memory section 32 may include registers which are allowed to be modified during the handling of a request without affecting the operation of the arrangement of which the memory mapping systems forms a part. For example, the second memory section may include registers which contain status information about the handling of a request, which may be updated by a respective processing unit.

The associated memories 9a-9m may for example be implemented in the memory of the request controller 3 by allocating to each associated memory 9a-9m a set of registers M#1-M#m. For each set M#1-M#m, for example write access may be set per bit location, and for example only those bit locations may be released which are allowed to be modified by the corresponding processing unit.

For example, a configuration field, e.g. a bit, in register set A may used to determine whether a processing unit is allowed to write in the set B and/or in the sets M#1-M#m. Thus, the access rights to register set B and to the sets M#1-M#m will correspond to the settings of the configuration field. If a processing unit is not allowed to make access to a respective associated memory, its write accesses to register set B may be blocked. The configuration bits and the access rights may for example be set such that only the processing unit with the highest safety level has write access to the register sets A and B, while every other processing unit only has write access to a respective associated memory 9a-9m.

The second memory section 32 and the associated memor(y)(ies) 9a-9m may be spaced apart. The distance between the second memory section and the associated memory may exceed a granularity of a memory protection scheme, e.g. as used by a memory management unit or a memory protection unit, thereby obviating the need to provide a memory protection scheme with a finer granularity. For instance, the memory protection scheme may provide protection at a byte level (that is: write control and/or read control may be set per byte of data) and second memory section 32 and the associated memories 9a-9m may have no overlap in bytes. The memory section 32 and the associated memory 9a-9m may for example be assigned different address ranges of a memory, between which there is a spacing which is at least as large as the granularity of the protection scheme.

Also, the main and/or associated memory may be on-chip memory and include a number of registers with a certain size, for example X bits. The memory may for example be provided with an access control mechanism which allows read and/or write access to be set per register. In such a case, for instance the main memory may use different registers than the associated memory, without any overlap in registers. For example the main memory may use a register set and the associated memories 9a-9m may use respective registers sets which do not overlap with the main memory.

Figure 2:
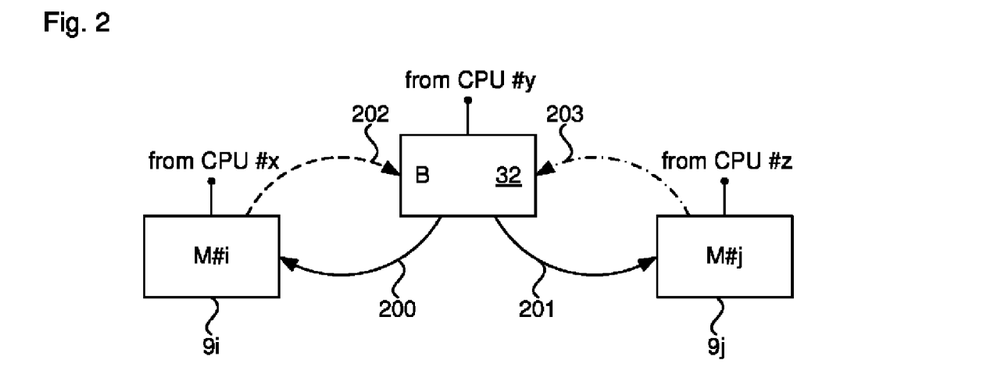
FIG. 2 shows an example of an embodiment of a memory mapping system suitable for the example of FIG. 1.

As mentioned, consistency between the second memory section and the associated memory may be maintained by the consistency control unit 33. As illustrated in FIG. 2, the consistency control unit 33 may include synchronization paths 201-203 between the second memory section 32 and the associated memories 9i,9j. Via the synchronization paths 201-203, data consistency between second memory section 32 and the associated memories may be maintained. For instance, if a processing unit changes e.g. bit locations of a register in the associated memory 9i, the corresponding bit locations may be updated by way of the signal path 202 in the part (e.g. the register) of the second memory section 32 which are associated with the respective part in the associated memory 9i. Signal path 200 allows updating bit locations in the associated memory 9i after the first processing unit (CPU #y) has written corresponding bit locations in the second memory section 32. As shown with the updating paths 201 and 203, for other register associated memory 9i a similar function may be present.

Figure 3:
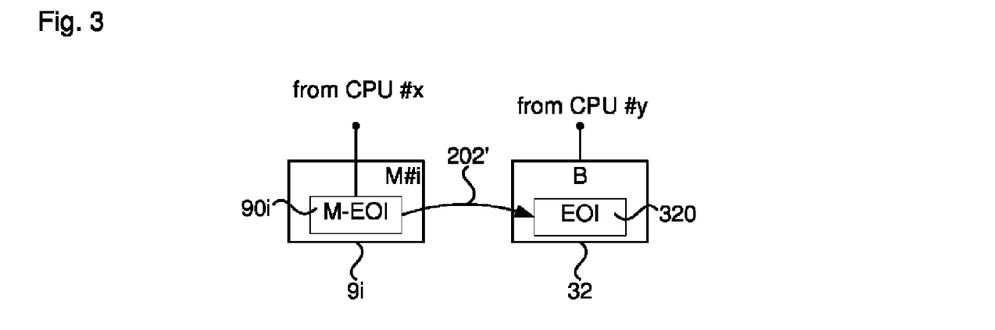
FIG. 3 illustrates a write access to the example of FIG. 2.

As another example of maintaining consistency between an associated memory 9i and the second memory section 32. A processing unit may for example terminate the execution of an interrupt routine with a write access to an EOI (End of Interrupt) register. As shown in FIG. 3, at the end of an interrupt service routine a second processing unit (CPU #x) may write an interrupt complete notification into an associated EOI register (M-EOI) 90i in the associated memory 9i. As shown, in the second memory section 32 an EOI register 320 may be present which is associated with the M-EOI 90i. The content of the EOI register 320 may then be updated via a signal path 202' which connects the MEOI 90i and the EOI 320. Thereby the end of the execution of the interrupt service routine becomes effective and all processing units can read in the respective memory that the interrupt has been handled.

In the memory mapping system 30 any data suitable for the specific implementation may be stored. The first memory section may for example contain configuration data and the first processing unit may have exclusive write access to the first memory section. Also, the second memory section and the associated memory may for example both include a request handling memory in which data about a handling of requests is stored. Referring to FIGS. 4-7 examples of embodiments which are capable of inter-processor request handing are shown. For instance, the memory mapping system may be used for inter processor interrupt (IPI) handling, e.g. for interrupts generated by a processing unit which are to be handled by another processing unit in the multiprocessing unit.

As illustrated in FIGS. 4-7, the first processing unit (CPU #y in those examples) may have write access to a part (xset0

... x-set5) of the second memory section 32 associated with blocked memory section (92,92')s (Mxset0 . . . Mx-set5) in an associated memory 9$i$, in order to store, for example, request demand messages. The second processing unit then may have write access to an un-blocked part (e.g. Mx-clr0 . . . MX-Clr5) of the associated memory 9$i$ in order to store request handled messages. Thereby, for example, the first processing unit can ask the second processing unit to execute a certain request, e.g. to execute a software routine, and the second processing unit can notify the first processing unit about the status of the request (e.g. that the request is handled).

In the examples of FIGS. 4-7, by way of example, the processing unit CPU #y has the highest priority and is designated first processing unit. Accordingly, CPU #y has exclusive write access to the second memory section B, while the other processing units CPU #x (and in FIG. 7 CPU #z) have write access to the respective associated memories 9$i$,9$j$ and not to the second memory section B.

Figure 4:
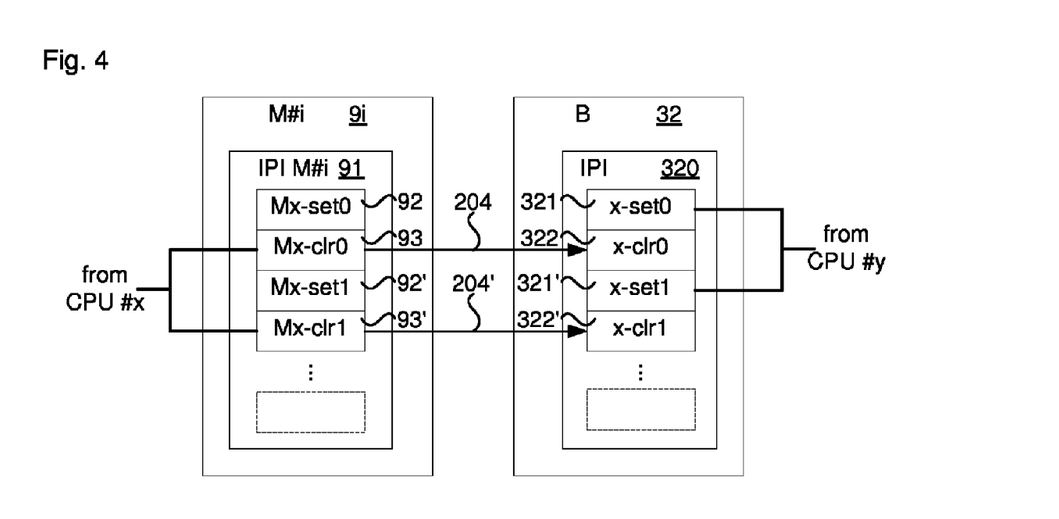
FIGS. 4-7 illustrate handling of different types of interrupt requests involving a multiple of processing units of the example of FIG. 1

As shown in FIG. 4, for example, sets of two bits 92,93; 92';93';321,322;321',322' (indicated with set and clr respectively in the figures) or other types of field may be provided for the same IPI in both the associated memor(y)(ies) 9$i$ and the second memory section 32. In the example shown in FIG. 4, the CPU #y may request an interrupt of the CPU #x by writing e.g. one of the two dedicated bits x_SET0 321 or x_SET1 321' in the IPI memory 32. After the execution of the interrupt service routine, the CPU #x writes on the corresponding bit Mx_CLR0 92 or Mx_CLR1 92' in the IPI associated memory 320. The changes of the bits Mx_CLR0 and Mx_CLR1 are transmitted to the bits x_CLR0 and x_CLR1 through the signal paths 204 and 204'.

Figure 5:
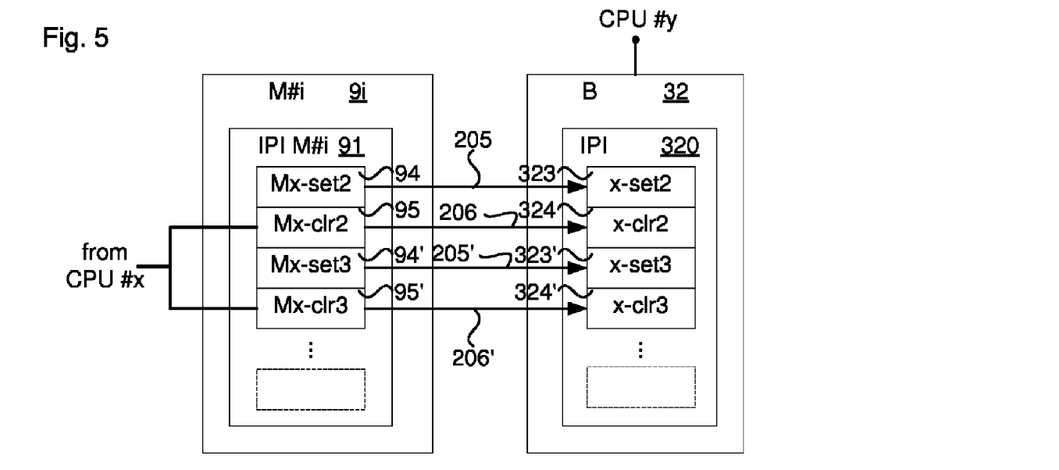

In the example shown in FIG. 5, the software running on the second processing unit CPU #x may request an interrupt of the processors by writing e.g. one of the two dedicated bits Mx_SET2 94 or Mx_SET3 94' in the IPI associated memory 91. The value of the changed bit Mx_SET2 or Mx_SET3 is transmitted via a respective signal path 205,205' for registration in the bit location x_SET2 323 or x_SET3 323' of the IPI memory 320. The interrupt request is then activated in the system based on the IPI memory 320. After the execution of the interrupt, the CPU #x may write on the corresponding bit Mx_CLR2 95 or Mx_CLR3 95' in the IPI associated memory 91. The changes to the bits Mx_CLR2 and Mx_CLR3 may then be transferred to the bits x_CLR2 and x_CLR3 via the signal paths 206 and 206'.

Figure 6:
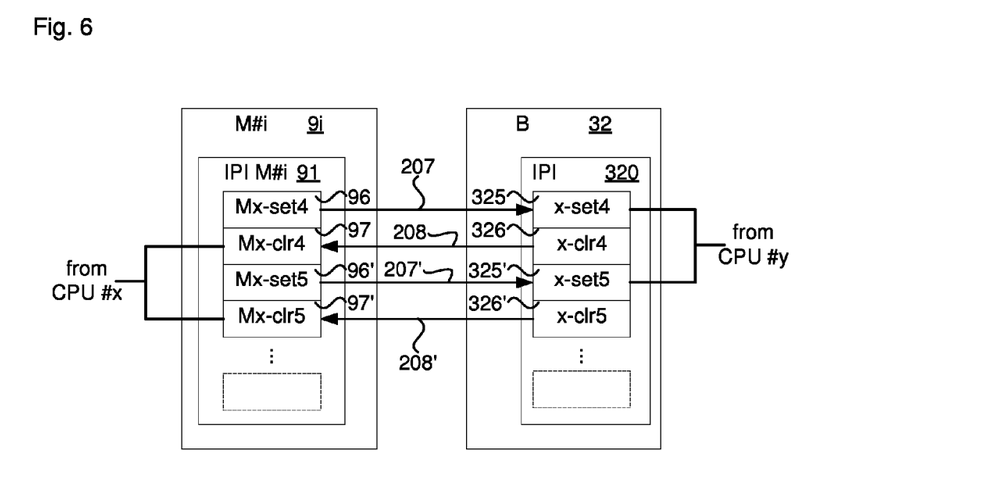

In the example shown in FIG. 6, the second processing unit CPU #x may request an interrupt of the first processing unit CPU #y by describing e.g. one of the two dedicated bits Mx_SET4 96 or Mx_SET5 96' in the associated IPI (Inter-Processor Interrupt) memory 91. Bit x_SET4 96 or x_SET5 96' may be set in the IPI memory 91 via path 207,207'. After the execution, the CPU #y may reset the corresponding bit x_CLR4 326 or x_CLR5 326' in the IPI memory 320. The reset value is registered in the associated IPI (Inter-Processor Interrupt) memory by way of signal path 208,208'.

Figure 7:
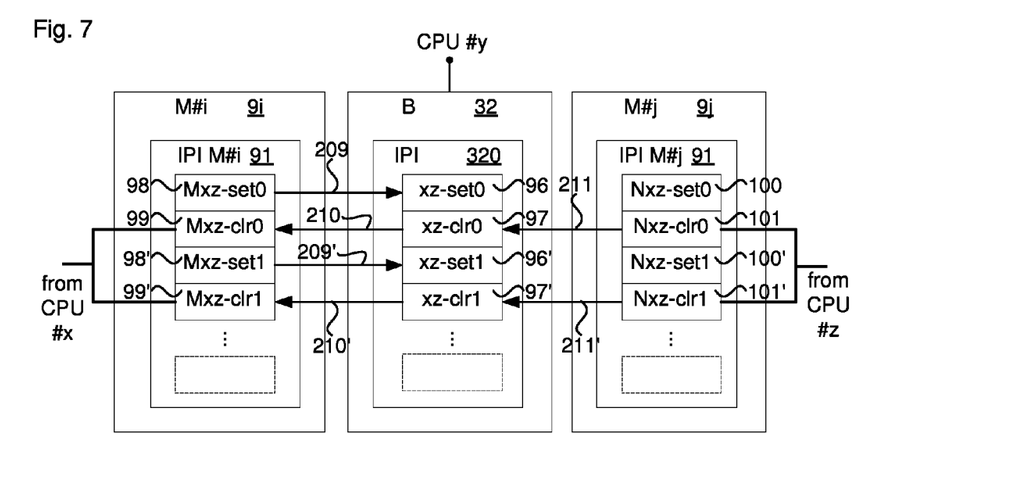

In the example shown in FIG. 7, the processing unit CPU #z may adopt an interrupt requested by the processing unit #x. To this end, the processing unit CPU #x may set the bit Mxz_SET0 98 or Mxz_SET1 98' in the IPI associated memory 91. Bit xz_SET0 96 or xz_SET1 96' in the IPI register 320 may be synchronized to the set values by way of a respective signal path 209, 209'. Thereafter, the processing unit CPU #z can start to execute the interrupt. After the execution of the interrupt, the processing unit CPU #z may write on the corresponding bit Nxz_CLR0 101 or Nxz_CLR1 101 in to the IPI associated register 91 assigned to the processing unit CPU #z. Via the signal path 211,211', this writing may be registered in the IPI register 320, and from there the bit value may be made visible in the associated IPI register 91 via the signal path 210 or 210', e.g. by synchronizing fields Mxz-clr0 and Mxz-clr1 to the fields in the IPI register 320 of the second memory section 32.

Referring back to FIG. 1, the request controller 3 may be implemented in any manner suitable for the specific implementation. The request controller 3 may for example control a processing of requests by one or more first processing units and by one or more second processing units. The requests may for example be an interrupt request, a context switch request, a task switch request, a thread switch request, a process switch request or another suitable type of request. The request controller may be arranged to control one of more of: inter processor interrupt requests, software interrupt requests, hardware interrupt requests.

In the shown example, the request controller is a central request controller (CRC). The CRC may receive requests from peripheral devices in the arrangement 1 or from devices outside the arrangement 1 and control the handling of the interrupts. The CRC may for example perform functions such as prioritizing requests, assigning requests to a specific processing unit for all the requests which are sent to (all) the processing units.

The multi-processing arrangement 1 may be implemented in any manner suitable for the specific implementation. The multi-processing arrangement may be implemented as a single integrated circuit. The multi-processing arrangement may for instance be implemented as a multi-core microprocessor or microcontroller used in a safety related application, such as, for example, a braking system, an electronic control unit, a seat belt, an air traffic control system, a fly-by-wire system, a life support system or in a central control node in a control system. In such a case, overwriting of data of another processing core with a higher safety level by a processing core with a lower safety level may effectively prevented using a memory mapping system. Thereby, adversely affecting of the higher safety level would may be prevented.

As explained below in more detail, at least a part of the data used by the first processing unit is protected against inadvertent modification by a respective second processing unit. For example, a processing unit may be designated as a main processor which may, for instance, configure the multi-processing arrangement 1. At least a part of the data used by the main processor, e.g. the configuration data, may be protected against inadvertent modification by other processing units (which thus are second processing units for the main processor, which thus forms a first processing unit).

The multi-processing arrangement may for instance include a plurality of processing units of which a main safety processing unit forms the first processing unit is and a redundant processing unit forms the second processing unit. Depending on the safety system in hardware and software, different safety levels (SIL1, SIL2, SIL3, or SIL4) according to IEC standard 61508 can be allocated to the processing units, with SIL4 representing the highest and SIL1 the lowest safety level. The safety level of a processing unit can be increased by an internal redundancy of hardware resources, for example. Two processor cores, monitoring each other reciprocally within a processing unit, offer a higher rate of safety than one single processor core. In conventional implementations of multi-processing arrangements, a SIL2 processing unit can modify data of an SIL3 processing unit in the interrupt controller 23. Thus, the less safe processing unit can impair the safety level of the safer processing unit. With the memory mapping system, such impairment may be prevented or at least the risk thereof reduced.

The selection of the main safety processing unit may be configurable, for example by writing in a configuration part of the first memory section 31. For example, if the multi-processing arrangement is used in a safety related application, the processing units may be designated first and second processing units based upon the safety level of the combination of the hardware system and software implementation on each processing unit. For instance, a processing unit with the highest safety level may be designated first processing unit for all other processing units. Also, one or more processing units with a second safety level below the highest safety level may act as a first processing unit with respect to other processing units with a safety level below the second safety level or all processing units with a safety level below the highest safety level may be designated second processing units. The safety level may for example be the Safety Integrity Level as defined by International Standard IEC 61508, with SIL 4 being the highest safety level and SIL 1 being the lowest safety level.

The first processing unit and/or the second processing unit may be arranged to execute a software application. The memory mapping system may be transparent for the software application. For example, the software application may receive interrupts, handle interrupts or generate interrupts without having to e.g. assign data to a specific one of the second memory section 32 or an associated memory.

Referring to the example of a multi-core processor of FIG. 1, for instance, the arrangement 1 may include a plurality of processor cores CPU#1-CPU#N which are connected to a Central Interrupt Request Controller (CIRC). In this example, the processor cores are connected to the CIRC, as indicated with the dash-dotted arrows, (and each other) via a processor bus 4. However it will be apparent that other suitable types of connections may be provided between the processor cores an the CIRC.

As shown in FIG. 1, one or more peripheral units (P#1-P#k) 6a-6k may be present. The peripheral unit(s) may for example be non-core components of the multi-core processor such as inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components. The peripheral unit(s) may be connected to the CIRC 3 (and each other), as indicated with the dotted arrows, e.g. via a peripheral bus 5. In this example, the peripheral units P#1-P#k are connected to the CIRC 3 via a peripheral bus 5, however it will be apparent that other suitable types of connections may be provided between the peripheral units and the CIRC.

The peripheral bus 5 and the processor bus 4 may be connected to each other via a peripheral bridge (P-Br) 7, which operates as an interface between the peripheral bus 5 and the processor bus 4.

During the execution of an interrupt routine, a processing unit 2a-2n may make access to memory of the CIRC 3. The processing unit 2a-2n can e.g. write into an EOI (End of Interrupt) memory in order to inform about the end of the execution of the interrupt. Interrupts between processing units (IPI: Inter-Processor Interrupt) may for example be triggered by means of write accesses to IPI memory of the CIRC 3.

Figure 8:
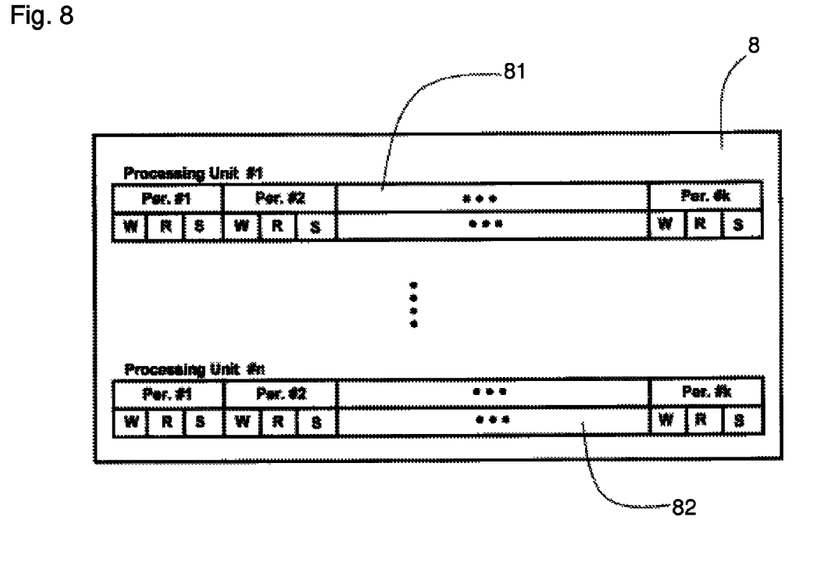
FIG. 8 shows a block diagram of an access protection unit suitable for the peripheral bridge of the example of FIG. 1.

The memory of the CIRC 3 is protected by an access protection unit 8 against unauthorized accesses. As shown, an access protection unit (Acc Prot) 8 may be present which verifies the origin of a write request and allows access to the main memory or an associated memory 9a-9m depending on the origin. For example, an identification of a current device that is allowed to use the bus 4, 5 may be sent to the access protection unit 8, for example by using the Advanced Microcontroller Bus System (AMBA) bus protocol. In conventional implementations of multi-processing chips, processing cores have the same read and write access rights to the register set of the Central Interrupt Request Controller. FIG. 8 illustrates the access protection unit 8. The access rights are fixed per section of the CIRC memory for each processing unit. For example, the access rights, e.g. read (r), write (w), execute (s), for the processing unit #1 to sections Per#1 . . . Per #k peripheries are realized by means of a set 81 whereas the access rights for the processing unit #2 to sections Per#1 . . . Per #k are realized by means of set 82.

Figure 9:
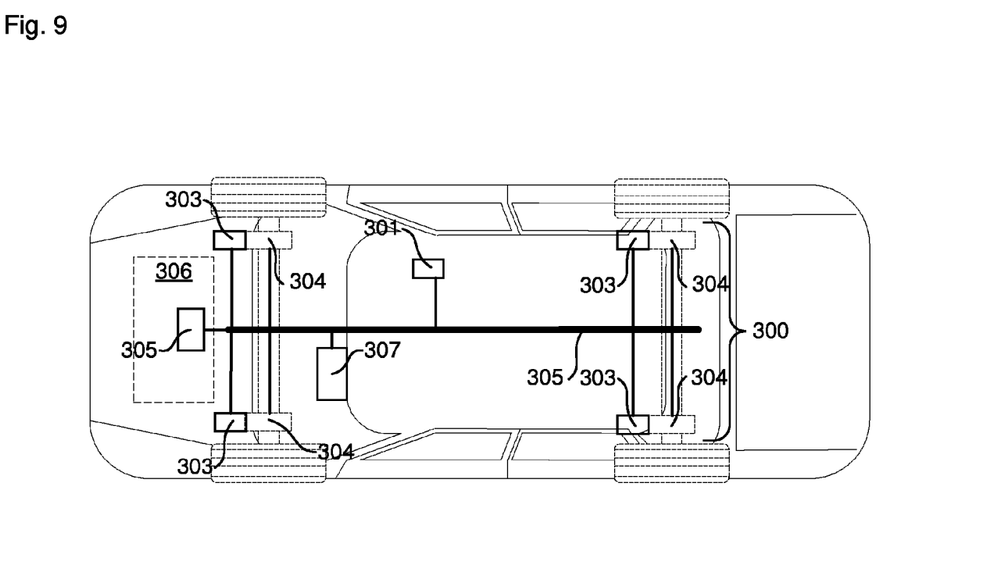
FIG. 9 schematically shows an example of an embodiment of an apparatus including a multi-processing arrangement.

Referring to FIG. 9, an example of an apparatus is shown therein. The example shown in FIG. 1, is a motorised vehicle, and more in particular is a car. The car may include a network 300 which, for example, processes data or control actuators in the network. The network 300 may include a central control unit (CCU) 301 which controls and supervises the components in the network. The components may for example include brake controllers 303 which control brakes 304, an engine controller 305 which controls an engine 306, a display controller 307 which controls the display of information at the dashboard, or other suitable components. One or more of the controllers and the CCU may be provided with a memory mapping system 30, and for instance be implemented as illustrated in FIG. 1.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, for the sake of simplicity, a single first processing unit has been used to elucidate the examples. However, it will be apparent that e.g. the multi-processing arrangement 1 may include a multiple of first processing units and/or a multiple of second processing units, that a processing unit may act as a second processing unit with respect to some of the other processing units while acting as a first processing unit with respect to another processing unit.

Furthermore, it will be apparent that a part of the data used by a second processing unit may be protected against inadvertent modification by a respective first processing unit as well, for example when the multi-processing arrangement 1 is implemented as a fully redundant system.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the multi-processor system 1 may be include a number of separate microprocessors or microcontrollers connected in a manner suitable to form the multi-processor system 1.

Also, devices functionally forming separate devices may be integrated in a single physical device. For example, as mentioned the multi-processing arrangement may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'one or more', and do not exclude a plurality. The mere fact that certain measures are recited in mutually different claims does not indicate that a combination of these measures cannot be used to advantage.

The invention claimed is:

1. A memory mapping system comprising a multi-processing arrangement, said multi-processing arrangement including a first processing unit and a second processing unit, said memory mapping system comprising:
    a main memory to which said second processing unit does not have write access, said main memory including a first memory section and a second memory section;
    an associated memory associated with said second memory section, said associated memory including a memory section to which said second processing unit has write access;
    a consistency control unit for maintaining consistency between data stored in said associated and data stored in said second memory section:
    wherein data to be used by said second processing unit can be stored in said parts of the second memory section to which said first processing unit has write access and data to be used by said first processing unit can be stored in said parts of the associated memory to which said second processing unit has write access.

2. A memory mapping system as claimed in claim 1, wherein said first processing unit has write access to at least said first memory section of said main memory.

3. A memory mapping system as claimed in claim 2, wherein said associated memory has a blocked memory section to which said second processing unit does not have write access and said first processing unit has write access to parts of said second memory section associated with said blocked memory section.

4. A memory mapping system as claimed in claim 1, wherein said associated memory has a blocked memory section to which said second processing unit does not have write access and said first processing unit has write access to parts of said second memory section associated with said blocked memory section.

5. A memory mapping system as claimed in claim 4, wherein said first memory section has a blocked memory section to which said first processing unit does not have write access and said second processing unit has write access to parts of said associated memory which are associated with said blocked memory section of the second memory section.

6. A memory mapping system as claimed in claim 4, wherein the first processing unit has write access to store request demand messages in said part of said second memory section associated with said blocked memory section and the second processing unit has write access to store request handled messages in an un-blocked part of the associated memory.

7. A memory mapping system as claimed in claim 1, wherein said second memory section and said associated memory both include a request handling memory in which data about a handling of requests is stored.

8. A memory mapping system as claimed in claim 1, wherein said second memory section and said associated memory are spaced apart and a distance between said second memory section and said associated memory exceeding a granularity of a memory protection scheme.

9. A memory mapping system as claimed in claim 1, wherein said first memory section contains configuration data and only said first processing unit has write access to said first memory section.

10. A memory mapping system as claimed in claim 1, including at least two associated memories, to which a respective second processing unit has write access and to which the other processing units do not have write access.

11. A request controller for controlling a processing of requests by a first processing unit and a second processing unit, said request controller including a memory mapping system as claimed in claim 1 and being arranged to control one or more of: interrupt requests, context switch requests, task switch requests, thread switch requests, process switch requests, inter processor interrupt requests, software interrupt requests, hardware interrupt requests.

12. A request controller as claimed in claim 11, said request controller being a central interrupt request controller.

13. A multi-processing arrangement, comprising:
    a first processing unit;
    a second processing unit; and
    a request controller as claimed in claim 1.

14. A multi-processing arrangement as claimed in claim 13, including a plurality of processing units of which a main safety processing unit forms the first processing unit is and a redundant processing unit forms said second processing unit is and wherein a selection of said main safety processing unit is configurable.

15. A multi-processing arrangement as claimed in claim 13, wherein said main safety processing unit is selected based upon a safety level of the processing unit.

16. A multi-processing arrangement as claimed in claim 13, wherein said first processing unit and/or said second processing unit are arranged to execute a software application and wherein said memory mapping system is transparent for said software application.

17. A multi-processing arrangement as claimed in claim 13, implemented as a single integrated circuit.

18. A method of controlling memory access by a first processing unit and a second processing unit, comprising:
    inhibiting said second processing unit to write to a main memory to which said second processing unit does not have write access, said main memory including a first memory section and a second memory section;
    allowing said second processing unit to write to an associated memory associated with said second memory section, said associated memory including a memory section to which said second processing unit has write access; and maintaining consistency between data stored in said associated memory and said second memory section, wherein data to be used by said second processing unit can be stored in said parts of the second memory section to which said first processing unit has write access and data to be used by said first processing unit can be stored in said parts of the associated memory to which said second processing unit has write access.

19. A memory mapping system comprising a multi-processing arrangement, said multi-processing arrangement including a first processing unit and a second processing unit, said memory mapping system comprising:

a main memory to which said second processing unit does not have write access, said main memory including a first memory section and a second memory section;

an associated memory associated with said second memory section, said associated memory including a memory section to which said second processing unit has write access; and a consistency control unit for maintaining consistency between data stored in said associated memory and data stored in said second memory section, wherein said second memory section and said associated memory both include a request handling memory in which data about a handling of requests is stored.

* * * * *